United States Patent [19]

Bonnamour

[11] 3,991,814

[45] Nov. 16, 1976

[54] CASTING MACHINE WITH MULTI-BAND POSITIONING DEVICE

[75] Inventor: Yves Bernard Bonnamour, Carrollton, Ga.

[73] Assignee: Southwire Company, Carrollton, Ga.

[22] Filed: Sept. 10, 1975

[21] Appl. No.: 612,216

[52] U.S. Cl. .................................. 164/278; 74/240; 83/820; 308/189 R
[51] Int. Cl.[2] ..................... B22D 11/06; F16H 7/18
[58] Field of Search ...................... 164/278, 276, 87; 83/817, 504, 820; 308/189 R, 189 A, 193, 195; 74/240

[56] References Cited
UNITED STATES PATENTS

| | | | |
|---|---|---|---|
| 637,329 | 11/1899 | Feix | 308/189 R |
| 1,797,662 | 3/1931 | Johnston et al. | 83/504 X |
| 3,318,364 | 5/1967 | Bray et al. | 164/278 X |
| 3,318,367 | 5/1967 | Bray | 164/276 |
| 3,354,767 | 11/1967 | Funakubo | 83/817 |
| 3,361,491 | 1/1968 | Nowisch | 308/189 R X |
| 3,811,492 | 5/1974 | Ward | 164/87 X |

Primary Examiner—Leonidas Vlachos
Assistant Examiner—Horace M. Culver
Attorney, Agent, or Firm—Van C. Wilks; Herbert M. Hanegan; Stanley L. Tate

[57] ABSTRACT

Apparatus for continuously casting molten metal wherein an endless band is used to form a mold by enclosing a portion of the peripheral groove of the casting wheel of a wheel-band type casting machine. The endless band is guided about the periphery of the casting wheel by a plurality of band support wheels, at least two of which are provided with adjustable band positioning apparatus for maintaining the endless band in proper alignment over the casting wheel during casting. Each band support wheel is rotatably mounted on a shaft and is axially adjustable relative to its respective shaft for positioning the endless band laterally of the casting wheel. Each shaft is also adjustably pivotable about a point intermediate the shaft ends for skewing the band support wheel rotational axis relative to the casting wheel axis to steer the endless band into a substantially centered position over the casting wheel groove.

8 Claims, 2 Drawing Figures

CASTING MACHINE WITH MULTI-BAND POSITIONING DEVICE

BACKGROUND OF THE INVENTION

This invention relates generally to metal founding, and more particularly to an apparatus for casting molten metal in a continuous casting machine of the wheel-band type.

In a known type of continuous casting machine, molten metal is poured into a mold defined by a peripheral groove in a rotatable casting wheel cooperating with an endless metal band which engages the casting wheel periphery to close the groove. Proper positioning of the endless band over the casting wheel periphery is necessary to prevent the molten metal from leaking between the band and groove and solidifying on the cast bar as a fin which must be removed before the cast bar is subsequently worked.

In one type of prior art continuous casting machine of the aforementioned type, proper positioning of the band on the casting wheel is achieved by providing retaining flanges on the casting wheel circumference adjacent the peripheral groove. Such flanges, in addition to interfering with the efficient cooling of the endless band as it engages the casting wheel periphery, subject the band edges to severe wear and damage resulting in short band life and reduced operating efficiency.

In another type of prior art continuous casting machine, such as that disclosed in U.S. Pat. No. 3,318,367 issued to T. L. Bray and assigned to the assignee of the present invention, a plurality of band support wheels are arranged about the casting wheel for engaging and supporting the endless band during its travel about the casting wheel periphery. One of these band support wheels is provided with a band positioning apparatus which includes linear motion means for moving the band support wheel axially along a line parallel to the casting wheel axis and pivotal motion means for pivoting the axis of the band support wheel about a pivot point laterally displaced from the support wheel. By appropriate adjustment of the linear and pivotal motion means, the band support wheel may be oriented with respect to the casting wheel so that, as the endless band passes therebetween, the band will be maintained in a path properly positioned over the casting wheel groove with a minimum of twisting and stress on the band. While the band positioning apparatus disclosed in U.S. Pat. No. 3,318,367 has proven to be an effective means for providing proper band tracking on a continuous casting machine, such band positioning apparatus includes a relatively complex and expensive arrangement of elements for linearly adjusting the band support wheel with respect to the casting wheel.

With the advent of larger and more sophisticated continuous casting machines having substantially longer bands and a large number of wheels for supporting and tensioning the band, a single band positioning apparatus, such as that described in the aforementioned U.S. Pat. No. 3,318,367 has proved inadequate in providing proper band tracking without inducing undesirably great stresses in the band. Experience has shown that the number of band failures due to band tracking devices increases with the number of wheels over which the band must travel and with an increase in the length of the band. The greater number of wheels renders effective band tracking more difficult with a single band positioning apparatus, and the longer bands are subject to greater overall variations in width and thickness than is the case with shorter bands.

Moreover, inasmuch as the band positioning apparatus described in U.S. Pat. No. 3,318,367 requires axial movement of the band support wheel shaft and inner sleeve, axial thrust is transmitted to the threads of the single linear motion adjustment shaft, rather than to the ball and socket member which has a greater axial thrust load capacity than the threads of the adjustment shaft. A further disadvantage of this arrangement is that the lubrication of the ball and socket member is rendered more difficult because of its mounting within relatively movable sleeves.

In a typical arrangement of large present-day casting machines, a number of the wheels upon which the band travels, e.g. idler wheels, pressure wheels and band support and tension wheels, are mounted such that their axes are relatively movable toward and away from the casting wheel axis. Even if the wheels are initially in substantially perfect alignment, subsequent movement of the wheels during operation of the casting machine, uneven bearing and band wear, tolerances in the fabrication of the band and the like, cause the band to become misaligned to such an extent that a single band positioning apparatus cannot provide proper band tracking. To maintain the longer bands of such machines properly positioned, the single adjustable band support wheel must be pivoted through a relatively large arc, thus causing large differentials in tensile stress across the width of the band. Such large stress differentials ultimately will cause stress cracks in the band, particularly along the more highly tensed edge portion of the band.

SUMMARY OF THE INVENTION

In view of the foregoing, it should be apparent that there still exists a need in the art for a band positioning apparatus which is not subject to the aforementioned limitations of the prior art devices. It is, therefore, a primary object of this invention to provide, for a continuous casting machine of the wheel-band type, band positioning apparatus which is capable of maintaining proper alignment of the band with the casting wheel peripheral groove while at the same time minimizing the stress differential across the band width caused by excessive twisting of the band.

More particularly, it is an object of the present invention to provide a continuous casting machine having band positioning apparatus including at least two cooperating band support wheels which are adjustable both axially along a line parallel to the casting wheel axis and pivotally about a pivot point laterally displaced from the band support wheel.

Still more particularly, it is an object of this invention to provide band positioning apparatus for a continuous casting machine which includes at least two cooperating band support wheels rotatably mounted on fixed shafts, each band support wheel being axially movable relative to its respective shaft.

Another object of this invention is to provide an improved band positioning apparatus for a continuous casting machine characterized by a simple, yet effective, arrangement for axially and pivotally adjusting the band support wheels to maintain the band in proper position on the casting wheel periphery.

A further object of this invention is to provide a band positioning apparatus of the aforementioned type wherein a support wheel may be axially adjusted without the necessity of moving the wheel support shaft relative to its mounting.

Briefly described, these and other objects of the invention are accomplished by providing a continuous casting machine comprising a rotatable casting wheel having a peripheral groove formed therein and an endless band supported and guided about a portion of the periphery of the casting wheel by a plurality of wheels, at least two of which are axially and pivotally adjustable band support wheels. Each adjustable band support wheel is rotatably mounted on a fixed shaft and is provided with means for moving the wheel axially of the shaft. For this purpose, each wheel has a central bushing which is mounted on the shaft by means of a pair of spaced roller bearings. A pair of flanged sleeves are disposed in opposite ends of the bushing and are provided with a plurality of adjustment bolts engaging threaded bores in the annular end faces of the bushing. To adjust the wheel axially of its shaft, the adjustment bolts of each flanged sleeve are tightened or loosened, as appropriate, to move the band support wheel in the desired direction of axial adjustment. By this arrangement, the present invention provides a very simple, easily fabricated mechanism for axially adjusting the band support wheels without the necessity of moving the wheel support shafts relative to their mountings.

Pivotal motion of an adjustable band support wheel is provided by limited movement in cross-planes of the end of the support wheel shaft remote from the wheel about a pivot point disposed along the intermediate portion of the shaft. The intermediate pivot of the shaft is provided preferably by a spherical bearing arrangement, as illustrated in the preferred embodiment of the invention disclosed herein, but may be provided by any known means, such as, for example, a ball and socket arrangement. Unlike the prior art mechanisms, axial thrust loads are transmitted directly to the pivotal motion bearing arrangement. Thus, the present band positioning apparatus is capable of withstanding greater axial thrust loads than was heretofore possible.

A further advantage of the present invention resides in the fact that the spherical bearing arrangement may be conveniently and readily lubricated by means of a conventional lubrication fitting mounted on the shaft housing.

Utilization of two or more adjustable band support wheels insures that the twisting moment applied to the band and tending to cause a differential stress across the band width will not be excessive at any one position along the path of band travel. In accordance with the present invention, such stresses will be substantially reduced and evenly distributed among the various positions of the adjustable band support wheels. Moreover, the plural adjustments contemplated by the present invention not only increase band life because of reduced stresses in the band, but also permits the use of less expensive grades of band material and more economical methods of band construction.

With these and other objects, advantages, and features of the invention that may become hereinafter apparent, the nature of the invention may be more clearly understood by reference to the following detailed description of the invention, the appended claims and to the views illustrated in the attached drawings, wherein:

DETAILED DESCRIPTION OF A PREFERRED EMBODIMENT

Figure 1:
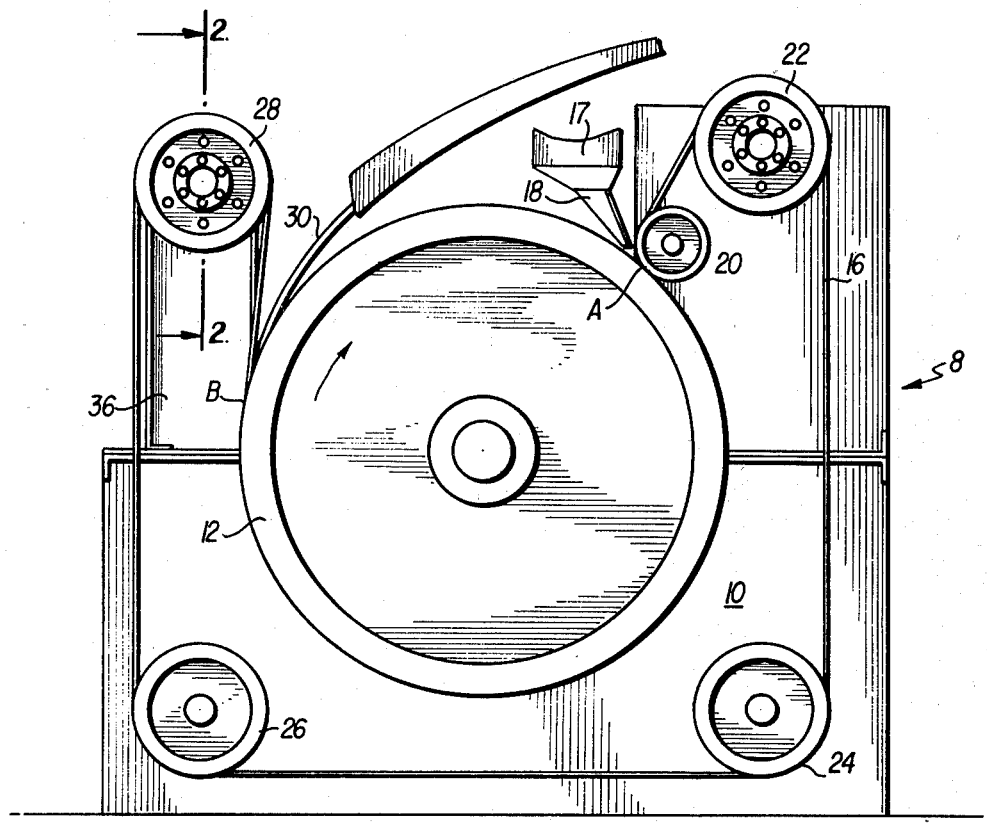
FIG. 1 is a schematic view of a wheel-band type continuous casting machine having band positioning apparatus according to the present invention.

Referring now in detail to the drawings, there is illustrated in FIG. 1 a wheel-band type continuous casting machine designated generally by reference numeral 8. The casting machine 8 includes a support frame 10 for mounting a casting wheel 12 which is rotatable in the direction shown by the arrow. The casting wheel 12 is provided with a peripheral groove (not shown) which is engaged over an arcuate portion thereof by an endless band 16 to define a mold cavity in conjunction with the casting wheel peripheral groove. Molten metal is introduced from a holding furnace (not shown) into a tundish 17 having a pour spout 18 depending therefrom and which is positioned generally above the casting machine 8. The molten metal is introduced into the mold cavity at an inlet point A where the endless band 16 initially engages the casting wheel periphery. A pivotable presser-band guide wheel 20 is rotatably mounted adjacent point A for urging the endless band 16 into close engagement with the periphery of the casting wheel 12.

Endless band 16 is further supported by band guide or support wheels 22, 24, 26 28 as it travels in a counterclockwise direction around such band support wheels and clockwise around the periphery of the casting wheel 12. As the molten metal introduced into the mold cavity at point A solidifies, it exits from the casting wheel groove as a continuous bar 30 at a point B where the endless band 16 is guided away from the periphery of the casting wheel 12 by the band support wheel 28.

Figure 2:
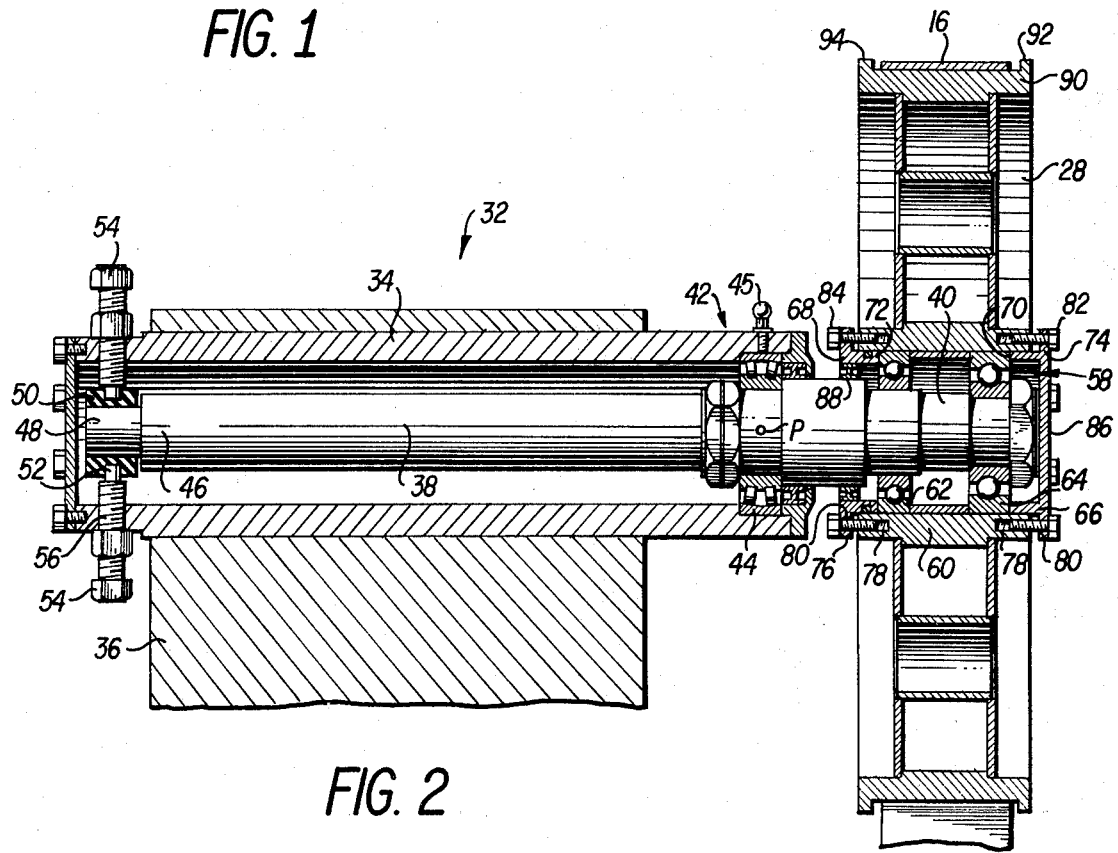
FIG. 2 is a cross-sectional view taken along line 2—2 of FIG. 1 and illustrates the band positioning apparatus of the present invention.

Band support wheels 22 and 28 are each provided with adjustable band positioning apparatus 32 (FIG. 2) for maintaining the endless band 16 in proper engagement with the peripheral groove in the casting wheel 12. For purposes of convenience, only the single adjustable band positioning apparatus 32 associated with the band support wheel 28 will be described herein. In FIG. 2 the adjustable band positioning apparatus 32 of band support wheel 28 is shown in greater detail and comprises a tubular sleeve 34 securely mounted on an upright support arm 36 forming a part of the support frame 10. Extending axially through the tubular sleeve 34 is an axle or shaft 38, one end 40 of which rotatably supports the band support wheel 28 in a manner to be hereinafter described.

Intermediate the ends of shaft 38, i.e. at the end 42 of tubular sleeve 34, the shaft is pivotally supported at point P within the tubular sleeve 34 by a spherical roller bearing arrangement 44 of well-known construction. It will be apparent to those skilled in the art that other pivotal support means may be utilized, such as the aforementioned ball and socket connection. A standard lubrication fitting 45 is mounted to the exterior of sleeve 34 adjacent the end 42 thereof for lubrication of the spherical roller bearing arrangement 44.

The other end 46 of shaft 38 has a reduced diameter portion 48 upon which is mounted a bushing 50. Circumferentially arranged about the bushing 50 is a plurality of equispaced blind bores 52 into which the inwardly extending ends of adjustment screws 54 are received. Adjustment screws 54 are threadably engaged in threaded bores 56 in the cylindrical wall of tubular sleeve 34 and are provided at the outward ends thereof with means for engaging a wrench to facilitate adjustment of the pivotal position of the shaft 38 about its pivot point P.

Axial adjustment of the band support wheel 28 along a line parallel to the axis of rotation of the casting wheel 12 and relative to shaft 28 is provided by the wheel bearing assembly 58. Band support wheel 28 is rotatably mounted by means of a central bushing 60 to a pair of roller bearings 62, 64 arranged in axially spaced relation at the end 40 of shaft 38. At opposite ends of the bushing 60, flanged sleeves 66, 68 are slidably mounted such that the inwardly facing annular ends 70, 72 thereof bear against the outwardly facing annular surfaces of an outer race of a respective roller bearing 62, 64. Flanged sleeves 66, 68 are provided with respective flange portions 74, 76 which confront in axially spaced relation the opposite end faces of the bushing 60. The end faces of bushing 60 are provided with a plurality of threaded bores 78 aligned with respective through holes 80 in the flange portions 74, 76. Adjustment bolts 82, 84 are threaded into bores 78 and by selective tightening and loosening of the bolts 82, 84, the band support wheel 28 may be axially moved relative to the casting wheel to thereby laterally adjust the position of the endless band 16 on the casting wheel periphery. For example, taking up or tightening of the adjustment bolts 82 and backing off or loosening the bolts 84 will cause axial motion of the band support wheel 28 to the right as seen in FIG. 2 and vice versa.

Flanged sleeve 66 is closed at its outer end by cover 86 and, together with annular seal 88 between shaft 38 and flanged sleeve 68, effectively prevents foreign matter from entering the bearings 62, 64 housed within the bushing 60. The peripheral portion 90 of the band support wheel 28 which engages the endless band 16 is provided with circumferential flanges 92, 94. As shown in FIG. 2, the space between the flanges 92, 94 is somewhat greater than the width of the endless band 16 and is sufficiently great to accommodate the full range of axial movement of the wheel 28. The purpose of the flanges 92, 94 is to prevent unusually large lateral excursions of the band 16 relative to the casting wheel 12. Under normal conditions, however, there should never occur contact between the flanges 92, 94 and the edge portions of the band 16.

Although only a single band positioning apparatus has been described, it is to be understood that in accordance with the present invention, at least two, and possibly all, of the band support wheels are provided with band positioning apparatus as illustrated in FIG. 2 to more effectively steer the band in relation to the casting wheel groove.

In the operation of the band positioning apparatus of the present invention, it will be appreciated by those skilled in the art that by axially moving the band support wheels 24, 28, the lateral position of the path over which the endless band 16 travels may be adjusted with respect to the casting wheel 12. Under certain circumstances, e.g., uneven bearing and band wear, non-uniform thermal expansion of the band the like, the lateral position of the band may shift even though the band support wheels are properly axially positioned with respect to the casting wheel. Selective skewing of the band support wheels by adjusting the pivotal position of their respective shafts will effectively eliminate any tendency of the band to creep laterally across the casting wheel periphery.

It will be apparent to those skilled in the art that the axial and pivotal motion means of the present invention may be adapted for automatic operation by suitable electrical and/or hydraulic apparatus in response to band position sensors, such as photoelectric cells and the like.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. In a casting machine for continuously casting molten metal wherein a flexible endless band is guided into closed relationship with an arcuate portion of the peripheral groove of a rotatable casting wheel to form a casting mold and including means for positioning the band over the peripheral groove of the casting wheel, the improvement comprising said band positioning means including at least two band support wheels positioned adjacent said casting wheel for supporting said endless band, said band support wheels being rotatable about axes substantially parallel to the rotational axis of said casting wheel, axial motion means operatively connected to each of said band support wheels for independently moving each band support wheel along a line of motion substantially parallel to its axis of rotation, and pivotal motion means operatively connected to each of said band support wheels for independently pivoting the axis of rotation of each band support wheel about a point laterally displaced from each band support wheel, wherein said band positioning means includes shafts for said band support wheels, each of said band support wheels being rotatably mounted at one end of a respective shaft, each of said band support wheels further including a central bushing mounted to its respective shaft by means of a pair of bearings axially spaced at said one end of said respective shaft, and wherein said axial motion means includes sleeve means slidably received in the opposite ends of each of said bushings for urging the band support wheel associated therewith relative to its shaft.

2. The casting machine according to claim 1, wherein said axial motion means further includes a plurality of threaded bores disposed in the opposite annular end faces of each bushing, flanges formed on each of said sleeve means in spaced confronting relation with the annular end faces of the bushing associated therewith, each flange being provided with holes therethrough aligned with the threaded bores of its confronting bushing end face, and adjustment bolts threadably engaging said threaded bores through the holes in said flanges for urging the associated band support wheel relative to its shaft.

3. Band positioning apparatus for adjusting the position of an endless band enclosing a portion of the peripheral groove of the casting wheel of a continuous casting machine, comprising a band support wheel rotatably mounted at one end of a shaft, said band support wheel having a central bushing mounted to said shaft by means of a pair of bearings axially spaced at said one end of said shaft, sleeve means slidably received in opposite ends of said bushing for urging the band support wheel axially relative to said shaft.

4. Band positioning apparatus according to claim 3 including a plurality of threaded bores disposed in the opposite end faces of said bushing, flanges formed on said sleeve means in spaced confronting relation with the end faces of said bushing, each of said flanges being provided with holes therethrough aligned with the threaded bores of its confronting bushing end face, and adjustment bolts threadably engaging said threaded bores through the holes in said flanges for urging the band support wheel axially relative to said shaft.

5. Band positioning apparatus according to claim 3 including pivotal motion means operatively connected to said shaft for pivoting said shaft about a pivot point axially displaced from said band support wheel along the axis of said shaft.

6. Band positioning apparatus according to claim 5 wherein said pivotal motion means comprises a spherical roller bearing mounted intermediately of said shaft and defining the pivot point of said shaft and adjustment screws being in cross planes against the other end of said shaft for pivoting said shaft about its pivot point.

7. Band positioning apparatus according to claim 6 including means for lubricating said spherical roller bearing.

8. Band positioning apparatus according to claim 3 wherein said band support wheel is provided with a pair of circumferential flanges between which the endless band of the casting machine is received, the spacing between said flanges being greater than the width of the band by at least the maximum total axial displacement of said band support wheel relative to said shaft.

* * * * *